United States Patent
Arnaud et al.

(10) Patent No.: US 7,439,983 B2
(45) Date of Patent: Oct. 21, 2008

(54) METHOD AND APPARATUS FOR DE-INDEXING GEOMETRY

(75) Inventors: Remi Arnaud, Foster City, CA (US); Roy Hashimoto, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 597 days.

(21) Appl. No.: 11/056,538

(22) Filed: Feb. 10, 2005

(65) Prior Publication Data

US 2006/0176310 A1    Aug. 10, 2006

(51) Int. Cl.
  *G09G 5/00*    (2006.01)
(52) U.S. Cl. .................. 345/581; 345/582; 345/422; 345/423; 345/531; 345/532; 345/539
(58) Field of Classification Search ................ 345/581, 345/582, 422, 423, 531, 532, 539
See application file for complete search history.

(56) References Cited

U.S. PATENT DOCUMENTS 6,593,923 B1 * 7/2003 Donovan et al. ............ 345/422
7,151,543 B1 * 12/2006 Moreton et al. ............ 345/531

* cited by examiner

*Primary Examiner*—Kimbinh T Nguyen
(74) *Attorney, Agent, or Firm*—Martine Penilla & Gencarella, LLP

(57) ABSTRACT

A pixel shader is operated to perform a first texture lookup in an index buffer to obtain a vertex index value for a geometric primitive to be displayed. The pixel shader is also operated to perform a second texture lookup in a vertex buffer to obtain vertex data, wherein the vertex data corresponds to the previously obtained vertex index value for the geometric primitive to be displayed. The first and second texture lookups are repeated by the pixel shader such that vertex data is obtained for each vertex required to define the geometric primitive to be displayed. The pixel shader is then operated to rasterize the geometric primitive to be displayed, wherein the rasterizing is performed using the vertex data previously obtained by the pixel shader.

20 Claims, 5 Drawing Sheets

METHOD AND APPARATUS FOR DE-INDEXING GEOMETRY

BACKGROUND

1. Field of the Invention

The present invention relates generally to computer graphics data processing.

2. Description of the Related Art

Modern computer graphics utilizes a variety of techniques for capturing/defining scenes and rendering the scenes on an electronic display device. One such technique involves defining the scene in terms of a number of geometric primitives, where the geometric primitive represents a particular polygonal shape. For example, the geometric primitive can be three-sided (triangular), four-sided (quadrilateral), five-sided (pentagonal), six-sided (hexagonal), etc. Each geometric primitive used to define the scene is characterized by its vertices. To represent its respective portion of the scene, each geometric primitive can be processed to display particular visual effects within a region defined its boundaries.

Each of the number of geometric primitives defining the scene can be translated into a corresponding set of pixel data to be used in rendering the scene image on the electronic display device. It is common for scenes in computer graphics to be defined by large numbers of geometric primitives. Consequently, defining and rendering the geometric primitives of a scene can include processing large amounts of data, e.g., vertex data. Therefore, a continuing need exists to improve computer graphics technology as it applies to defining and rendering scenes using geometric primitives.

SUMMARY

In one embodiment, a method is disclosed for operating a pixel shader to perform de-indexing of a geometric primitive to be displayed. The method includes an operation for performing a first texture lookup in an index buffer to obtain a vertex index value for the geometric primitive to be displayed. The method also includes an operation for performing a second texture lookup in a vertex buffer to obtain vertex data, wherein the vertex data corresponds to the previously obtained vertex index value for the geometric primitive to be displayed. The method further includes repeating the operations for performing the first and second texture lookups such that vertex data is obtained for each vertex required to define the geometric primitive to be displayed. The method further includes an operation for rasterizing the geometric primitive to be displayed, wherein the rasterizing is performed using the previously obtained vertex data generated from within the pixel shader.

In another embodiment, a method is disclosed for de-indexing a geometric primitive to be displayed. The method includes operating a rasterizer to read a number of vertex index values from an index buffer. The number of vertex index values read from the index buffer is sufficient to define the geometric primitive to be displayed. The method also includes operating the rasterizer to read vertex data from a vertex buffer. The vertex data read from the vertex buffer corresponds to each of the number of vertex index values read from the index buffer. Each of the number of vertex index values refers to a particular entry in the vertex buffer. The method further includes operating the rasterizer to rasterize the geometric primitive to be displayed according to the vertex data.

In another embodiment, an apparatus is disclosed for rasterizing a geometric primitive to be displayed. The apparatus includes a first texture lookup circuit defined within a rasterizer to obtain a vertex index value for the geometric primitive to be displayed. The vertex index value is to be obtained from an index buffer. The apparatus also includes a second texture lookup circuit defined within the rasterizer to obtain vertex data corresponding to the previously obtained vertex index value for the geometric primitive to be displayed. The vertex data is to be obtained from a vertex buffer. The first and second texture lookup circuits are further defined to operate to obtain a complete set of vertex data for the geometric primitive to be displayed. The apparatus further includes a rasterization circuit defined within the rasterizer to generate pixel data for the geometric primitive to be displayed based on the complete set of vertex data.

In another embodiment, a computer readable media is disclosed, wherein the computer readable media has program instructions stored thereon for operating a pixel shader to perform de-indexing of a geometric primitive to be displayed. The computer readable media includes program instructions for performing a first texture lookup in an index buffer to obtain a vertex index value for the geometric primitive to be displayed. The computer readable media also includes program instructions for performing a second texture lookup in a vertex buffer to obtain vertex data corresponding to the previously obtained vertex index value for the geometric primitive to be displayed. The computer readable media further includes program instructions for repeating the first and second texture lookups for each vertex required to define the geometric primitive to be displayed. Additionally, the computer readable media includes program instructions for rasterizing the geometric primitive to be displayed, wherein the rasterizing is performed using the previously obtained vertex data generated from within the pixel shader.

In another embodiment, an apparatus is disclosed for rasterizing a geometric primitive to be displayed. The apparatus includes means for performing a first texture lookup within a rasterizer to obtain a vertex index value for the geometric primitive to be displayed. The vertex index value is to be obtained from an index buffer. The apparatus also includes means for performing a second texture lookup within the rasterizer to obtain vertex data corresponding to the previously obtained vertex index value for the geometric primitive to be displayed. The vertex data is to be obtained from a vertex buffer. The means for performing the first and second texture lookups are further defined to obtain a complete set of vertex data for the geometric primitive to be displayed. Additionally, the apparatus includes means for generating pixel data for the geometric primitive to be displayed based on the complete set of vertex data.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
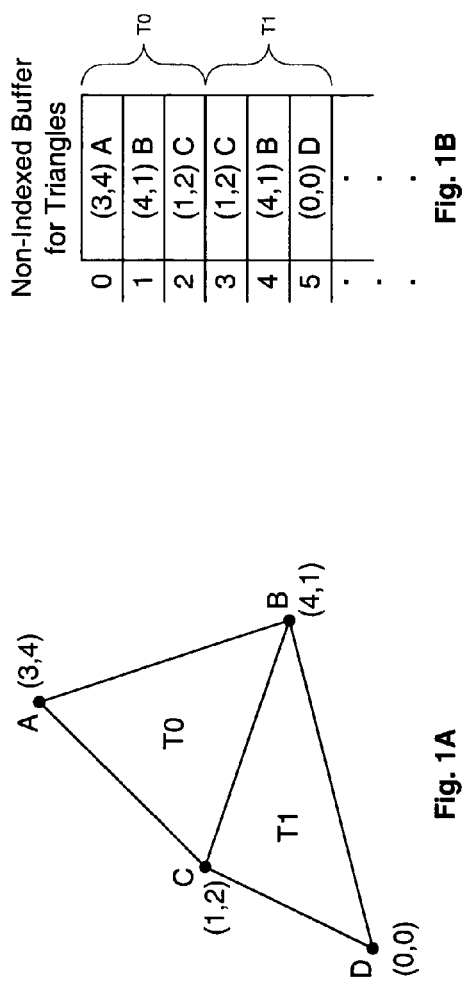
FIG. 1A is an illustration showing two triangles (T0 and T1) within a scene to be rendered on a computer display as a graphics image.
FIG. 1B is an illustration showing a non-indexed buffer for triangles including the vertex data required to describe each of triangles T0 and T1.
FIG. 1C is an illustration showing a vertex buffer for use in performing a vertex indexing process.
FIG. 1D is an illustration showing an index buffer defined to correlate the appropriate vertices as included in the vertex buffer to each of triangles T0 and T1.
FIG. 1E is an illustration showing a non-indexed triangle strip buffer including the vertex data required to describe each of triangles T0 and T1 in FIG. 1A.
FIG. 1F is an illustration showing a triangle strip index buffer (TSIB) defined to correlate the appropriate vertices, as included in the vertex buffer (VB) of FIG. 1C, to each of triangles T0 and T1.

Vertex indexing in computer graphics is performed to reduce an amount of graphics data that needs to be stored and transmitted through a graphics pipeline. Vertex indexing can be readily described by way of example. FIG. 1A is an illustration showing two triangles (T0 and T1) within a scene to be rendered on a computer display as a graphics image. Each of triangles T0 and T1 is defined by three vertices. Triangle T0 is defined by a vertex A at coordinates x=3 and y=4, a vertex B at coordinates x=4 and y=1, and a vertex C at coordinates x=1 and y=2. Triangle T1 is defined by the vertex C at coordinates x=1 and y=2, the vertex B at coordinates x=4 and y=1, and a vertex D at coordinates x=0 and y=0. It should be noted that triangles T0 and T1 share vertices C and B.

Without vertex indexing, each of triangles T0 and T1 will need to be defined by each of its three respective vertices. FIG. 1B is an illustration showing a non-indexed buffer for triangles including the vertex data required to describe each of triangles T0 and T1. As shown in FIG. 1B, triangle T0 is defined by the coordinates for vertices A, B, and C. Additionally, triangle T1 is defined by the coordinates for vertices C, B, and D. The numbers presented in the leftmost vertical column of FIG. 1B represent index values for the non-indexed buffer for triangles. It should be appreciated that without vertex indexing, six vertex coordinate entries are required to define triangles T0 and T1.

FIG. 1C is an illustration showing a vertex buffer (VB) for use in performing a vertex indexing process. The vertex buffer (VB) of FIG. 1C includes data for the vertices required to define the triangles T0 and T1 from FIG. 1A. Each unique vertex as defined by its coordinates is stored once in the vertex buffer (VB). Thus, the vertex buffer (VB) includes one entry for each of vertices A, B, C, and D, as required to define the triangles T0 and T1. The numbers presented in the leftmost vertical column of FIG. 1C represent index values for the unique vertices stored in the vertex buffer (VB). It should be appreciated that the vertex buffer (VB) can be considered a one-dimensional array, wherein the one-dimensional array can be navigated in one-dimension, i.e., by a single index, to store and access coordinate information for a unique vertex. It should be appreciated that the vertex buffer (VB) includes data for each of four vertices, rather than each of six vertices as included in the non-indexed buffer of FIG. 1B. Thus, using the vertex buffer (VB) avoids duplicate storage of vertex coordinate data. Additionally, use of the vertex buffer (VB) enables operations, e.g., transformation, transmission, etc., to be performed on the vertex data without duplication.

To enable use of the vertex buffer (VB) in fully describing each of triangles T0 and T1, however, a mechanism needs to be provided for correlating the appropriate vertices to each triangle. FIG. 1D is an illustration showing an index buffer (IB) defined to correlate the appropriate vertices as included in the vertex buffer (VB) to each of triangles T0 and T1. The index buffer (IB) of the present example, is defined as a two-dimensional array, wherein a first dimension is used to navigate through the various triangles, e.g., T0 and T1, and a second dimension is used to navigate through the three vertices necessary to define a particular triangle. The first dimension is represented by the leftmost vertical column of numbers in FIG. 1D and is labeled as the index for each triangle, e.g., T0, T1, etc. The second dimension is represented by the topmost horizontal row of numbers in FIG. 1D and is labeled as the index for each of the three vertices of each triangle, i.e., 0, 1, and 2. It should be appreciated that the first and second dimension index values are navigatable parameters used to define the index buffer (IB) in memory.

The index buffer (IB) is loaded with data corresponding to the vertex index values of each triangle as stored in the vertex buffer (VB). Consider that a particular data item in the index buffer (IB) can be referenced by IB[triangle number,vertex number], wherein triangle number refers to the triangle number in the graphics scene and vertex number refers to either of the three vertices required to define the triangle corresponding to the triangle number. Thus, IB[0,0 . . . 2] includes vertex index values 0, 1, and 2, wherein the vertex index value 0 refers to vertex A in VB, the vertex index value 1 refers to vertex B in VB, and the vertex index value 2 refers to vertex C in VB. Additionally, IB[1,0 . . . 2] includes vertex index values 2, 1, and 3, which respectively refer to vertices C, B, and D in VB.

As an alternative to the triangle representation previously described with respect to FIG. 1B, a triangle strip can be used to represent triangles within a scene. In a triangle strip, triangles are implicitly defined from a vertex array/buffer in groups of three vertices, stepping one vertex at a time. FIG. 1E is an illustration showing a non-indexed triangle strip buffer including the vertex data required to describe each of triangles T0 and T1 in FIG. 1A. As shown in FIG. 1E, triangle T0 is defined by the coordinates for vertices A, B, and C. Additionally, triangle T1 is defined by the coordinates for vertices B, C, and D.

Triangle strips can also be indexed. For example, FIG. 1F is an illustration showing a triangle strip index buffer (TSIB) defined to correlate the appropriate vertices, as included in the vertex buffer (VB) of FIG. 1C, to each of triangles T0 and T1. The triangle strip index buffer (TSIB) of the present example is defined in the same manner as the triangle strips. However, the triangle strip index buffer (TSIB) includes data corresponding to the vertex index values of each triangle as stored in the vertex buffer (VB). Thus, with respect to FIG. 1F, triangle T0 is defined by vertex index values 0, 1, and 2. Triangle T1 is defined by vertex index values 1, 2, and 3. It should be appreciated that the present invention as described below is equally applicable to rasterization of both indexed triangles, such as previously described with respect to FIGS. 1A-1D, and indexed triangle strips, such as previously described with respect to FIGS. 1A, 1C, 1E, and 1F.

As illustrated in FIGS. 1A-1F, vertex indexing can be useful for reducing the amount of vertex data to be stored and processed, particularly in scenes defined by triangles having a large number of shared vertices. Furthermore, it should be appreciated that vertex indexing can be practiced with essentially any geometric primitive that is defined by vertices. For example, in addition to the triangle, the vertex indexing as previously described can be applied to four-sided, five-sided, six-sided, etc., polygonal geometric primitives. For ease of discussion, the remainder of the present invention will be discussed in terms of triangles, however, it should be understood that the principles of the present invention can be equally applied to any geometric primitive that is defined by vertices.

Figure 2:
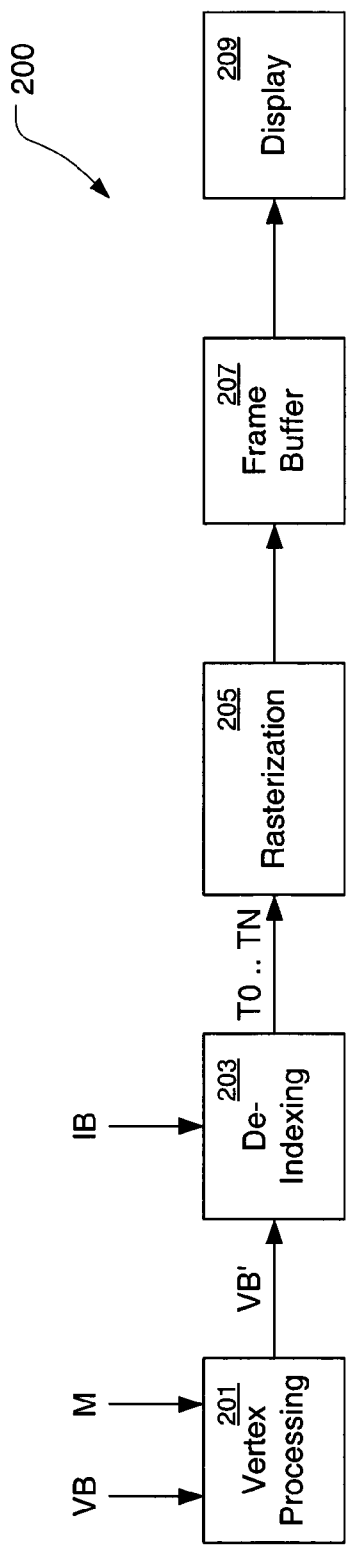
FIG. 2 is an illustration showing a vertex-pixel pipeline for displaying a scene, wherein vertex indexing is used to handle data associated with triangles defining the scene.

Prior to performing pixel processing to render the triangles of the scene, it is necessary to perform a de-indexing process such that each triangle of the scene is independently and explicitly defined by each of its three vertices. FIG. 2 is an illustration showing a vertex-pixel pipeline 200 for displaying a scene, wherein vertex indexing is used to handle data associated with triangles defining the scene. The vertex-pixel pipeline 200 assumes that the vertex indexing process as previously described with respect to FIG. 1A-1F has been performed for each triangle defining the scene. Thus, an appropriate vertex buffer (VB) and a corresponding index buffer (IB/TSIB) exists for the scene to be displayed. For ease of discussion, the remainder of the present invention will be described in the context of triangle indexing as described with respect to FIGS. 1A-1D. However, it should be appreciated that the principles of the present invention are equally applicable in the context of triangle strip indexing.

The vertex-pixel pipeline 200 includes a vertex processing module 201. The vertex processing module receives as input the vertex buffer (VB) and a processing matrix (M). It should be appreciated that the phrase "receives as input" can be embodied either as actually receiving the relevant data as an input stream into a memory within the vertex processing module 201, or as enabling the vertex processing module 201 to access and retrieve the relevant data from a memory in communication with the vertex-pixel pipeline 200. The vertex processing module 201 functions to transform the vertex data within the vertex buffer (VB) into vertex data appropriate for rendering on the screen, i.e., in screen space. It should be appreciated that the vertex processing module 201 can be defined as dedicated hardware, software, or a combination of dedicated hardware and software.

The processing matrix (M) represents a means for transforming the vertex data within the vertex buffer (VB) into screen space. In various embodiments, the processing matrix (M) can perform a number of different transformation operations on the vertex data. For example, in one embodiment, the processing matrix (M) can be defined to convert each vertex in (VB) to an appropriate pixel location. In another embodiment, the processing matrix (M) can be defined to modify each vertex in (VB) such that the triangles defining the scene are appropriately stretched or skewed. It should be appreciated that the processing matrix (M) can be defined to transform the vertices in (VB) in accordance with essentially any graphics processing technique as known to those skilled in the art. Therefore, in some embodiments the processing matrix (M) can represent a complicated function to be applied to the vertices within (VB). Once the vertices in (VB) are transformed by the processing matrix (M), the vertex buffer is represented as (VB'). The vertex buffer (VB') includes each of the unique vertices, although appropriately transformed, as previously included in (VB). Thus, the index buffer (IB) is equally applicable to the vertex buffer (VB').

The vertex-pixel pipeline 200 further includes a de-indexing module 203 for performing a de-indexing process to generate a complete set of vertex data for each triangle to be rendered in the scene. The de-indexing module 203 receives as input the vertex buffer (VB') and the index buffer (IB). It should be appreciated that the phrase "receives as input" can be embodied either as actually receiving the relevant data as an input stream into a memory within the de-indexing module 203, or as enabling the de-indexing module 203 to access and retrieve the relevant data from a memory in communication with the vertex-pixel pipeline 200. In the present embodiment, the de-indexing module 203 is defined as a dedicated hardware component within the vertex-pixel pipeline 200.

The de-indexing module 203 functions to explicitly define each vertex of each triangle represented in the index buffer (IB). Thus, the de-indexing module 203 uses the vertex index values stored for each vertex of each triangle in the index buffer (IB) to retrieve the corresponding vertex data from the vertex buffer (VB'). The retrieved vertex data for each vertex of each triangle is transmitted from the de-indexing module 203 to a rasterization module 205 within the vertex-pixel pipeline 200. Therefore, for each triangle within the scene (i.e., T0 to TN−1, wherein N represents a total number of triangles in the scene), the de-indexing module 203 functions to transmit the corresponding vertex data from the vertex buffer (VB') to the rasterization module 205, in accordance with the vertex index values stored in the index buffer (IB).

The rasterization module 205 functions to define pixel values for rendering each triangle as defined by the vertex data received from the de-indexing module 203. It should be appreciated that rendering each triangle includes not only rendering the vertex pixels but also the pixels within the triangle boundaries. Thus, the pixel values for each triangle as defined by the rasterization module 205 includes both the vertex pixel values of the triangle and the pixel values within the boundaries of the triangle.

The pixel values defined by the rasterization module 205 for display are stored in a frame buffer 207. The frame buffer 207 represents a memory structure that includes an appropriate number of storage cells for each pixel of a display, e.g., screen. The pixel data stored in the frame buffer 207 is transmitted to a display module 209, wherein it is appropriately processed and displayed. Those skilled in the art will appreciate the detailed functionality of the frame buffer 207 and display module 209.

In one embodiment, the frame buffer 207 is defined as a portion of a larger memory associated with the rasterization module 205. The larger memory can be used to hold one or more frame buffers to display, vertex data (e.g., VB, VB'), index data (e.g., IB), textures, and other data on occasion. Allocation of the larger memory is flexible. For example, memory at a specific address may be part of a frame buffer at one time, be part of a texture at another time, and be part of a vertex array at yet another time.

Figure 3:
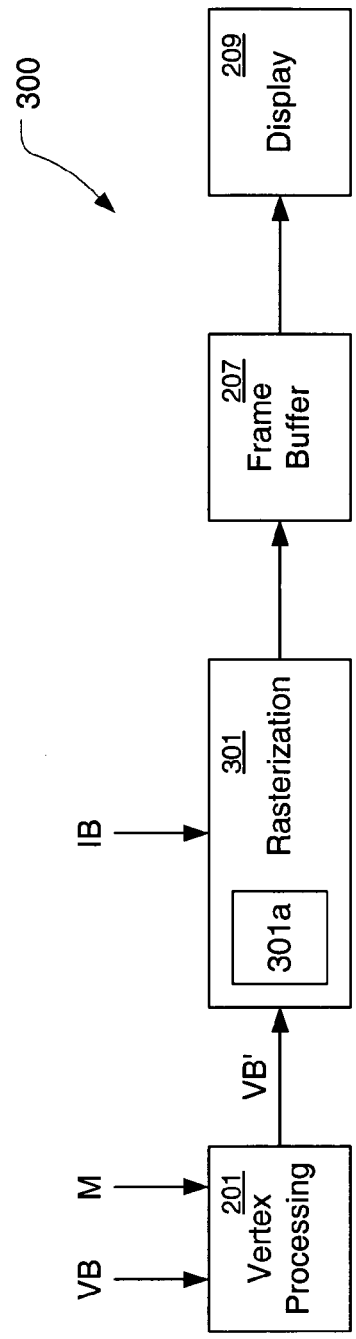
FIG. 3 is an illustration showing an enhanced vertex-pixel pipeline, in accordance with one embodiment of the present invention.

FIG. 3 is an illustration showing an enhanced vertex-pixel pipeline 300, in accordance with one embodiment of the present invention. The enhanced vertex-pixel pipeline 300 includes the vertex processing module 201, the frame buffer 207, and the display module 209, as previously described with respect to FIG. 2. However, the enhanced vertex-pixel pipeline 300 does not include the de-indexing module 203. Furthermore, the enhanced vertex-pixel pipeline 300 includes a de-indexing rasterization module 301.

As previously discussed, the vertex processing module 201 receives as input the vertex buffer (VB) and a processing matrix (M). In accordance with the processing matrix (M), the vertex processing module 201 functions to transform the vertex data within (VB) into vertex data appropriate for rendering on the screen. The transformed vertex data is represented as being stored in the vertex buffer (VB'). The vertex buffer (VB') is made available to the de-indexing rasterization module 301.

The de-indexing rasterization module 301 receives as input the vertex buffer (VB') and the index buffer (IB). It should be appreciated that the phrase "receives as input" can be embodied either as actually receiving the relevant data as an input stream into a memory within the de-indexing rasterization module 301, or as enabling the de-indexing rasterization module 301 to access and retrieve the relevant data from a memory in communication with the enhanced vertex-pixel pipeline 300. The de-indexing rasterization module 301 includes a de-indexing functionality 301a. The de-indexing functionality 301a is defined to use the vertex index values stored for each vertex of each triangle in the index buffer (IB) to obtain the corresponding vertex data from the vertex buffer (VB'). The vertex data obtained from (VB') for each vertex of each triangle is then processed by the de-indexing rasterization module 301 to define pixel data for rendering each triangle. The pixel data defined by the de-indexing rasterization module 301 is stored in the frame buffer 207. The pixel data stored in the frame buffer 207 is then transmitted to the display module 209, wherein it is appropriately processed and displayed.

In one embodiment, the de-indexing rasterization module 301 of the enhanced vertex-pixel pipeline 300 is defined to be a hardware equivalent of the rasterization module 205 of the vertex-pixel pipeline 200. However, in this embodiment, the de-indexing rasterization module 301 is programmed to provide the de-indexing functionality 301a, whereas the rasterization module 205 is not. Thus, with the de-indexing rasterization module 301 in the enhanced vertex-pixel pipeline 300, the dedicated hardware of the de-indexing module 203 is not required.

Figure 4:
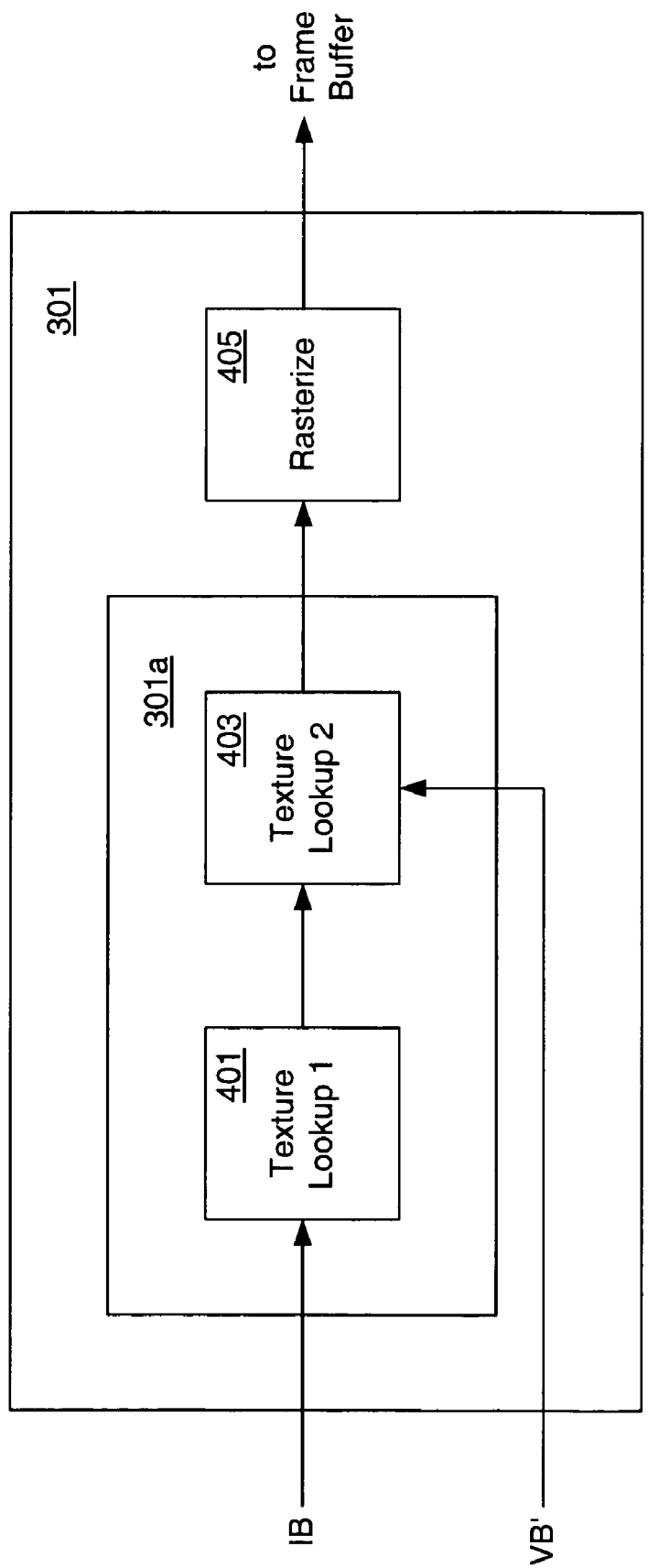
FIG. 4 is an illustration showing the de-indexing rasterization module, in accordance with one embodiment of the present invention.

FIG. 4 is an illustration showing the de-indexing rasterization module 301, in accordance with one embodiment of the present invention. As previously discussed, the de-indexing rasterization module 301 includes the de-indexing functionality 301a. In FIG. 4, the de-indexing functionality 301a is represented as including means for performing a first texture lookup process 401 and means for performing a second texture lookup process 403. Those skilled in the art will recognize that a texture lookup in the context of a rasterization module refers to a process by which the rasterization module accesses and reads geometric primitive data within a memory location, e.g., cache, RAM, etc. It should be appreciated that the means for performing the first and second texture lookup processes (401 and 403) can include circuitry defined within the de-indexing rasterization module 301. The circuitry, or portions thereof, can be designed in a function-specific manner or can designed to be programmed to perform necessary functions.

In the first texture lookup process 401, the de-indexing rasterization module 301 is programmed to perform a texture lookup in the index buffer (IB) to obtain the vertex index values for a triangle. The de-indexing rasterization module 301 is further programmed to use the vertex index values obtained in the first texture lookup process 401 in the second texture lookup process 403 to obtain the corresponding vertex data from (VB'). The data obtained from VB' in the second texture lookup process 403 explicitly defines each vertex of the triangle. The data obtained from VB' in the second texture lookup process 403 is used by a rasterize module 405 to define pixel data for rendering the triangle. As previously stated, rendering of the triangle includes not only rendering the vertex pixels but also the pixels within the triangle boundaries. Thus, the rasterize module 405 defines pixel data for each vertex of the triangle and the region within the boundaries of the triangle. Then, as previously discussed, the pixel data defined by the rasterize module 405 is transmitted from the de-indexing rasterization module 301 to the frame buffer 207.

It should be appreciated that the rasterize module 405 represents means for generating pixel data for the geometric primitive to be displayed based on the corresponding complete set of vertex data. The rasterize module 405 can be defined as circuitry within the de-indexing rasterization module 301. The circuitry, or portions thereof, can be designed in a function-specific manner or can designed to be programmed to perform necessary functions.

As previously discussed, the enhanced vertex-pixel pipeline 300 including the de-indexing rasterization module 301 can be used in conjunction with any geometric primitive, beyond the exemplary triangles as referenced herein. Furthermore, the data defining each vertex of each geometric primitive can be expanded to any number of coordinates and attributes beyond the minimum required two-dimensional spatial coordinates "x" and "y." It should be appreciated that the data defining each vertex is not limited to coordinates. For example, there may be color data assigned to each vertex. In an embodiment where more coordinates and/or attributes are used to define each vertex, the vertex buffers (VB and VB') will be appropriately expanded to accommodate the additional data for each unique vertex. Additionally, the de-indexing rasterization module 301 will be programmed to obtain the appropriate expanded coordinate information from VB' in the second texture lookup process 403. It should be further appreciated that if the de-indexing rasterization module 301 limits the type or number of data at each vertex that can be accessed as a texture in a single pass, or the type or number of data that can be written in a single pass, multiple passes may be used to de-index all vertex data. It should be further appreciated that the de-indexing rasterization module 301 can also be referred to as a de-indexing pixel shader, a de-indexing graphics synthesizer, a rasterizer, a pixel shader, a graphics synthesizer, or a fragment shader.

In accordance with the foregoing, the de-indexing rasterization module 301 of the present invention is programmed to receive as input both the index buffer (IB) and the vertex buffer (VB'), rather than simply receiving as input the explicit triangle vertex data, as done with the rasterization module 205. Additionally, the de-indexing rasterization module 301 of the present invention is programmed to perform two texture lookups to obtain explicit triangle vertex data, thus effectively performing the de-indexing process. Furthermore, the de-indexing rasterization module 301 of the present invention is programmed to use the explicit triangle vertex data obtained by performing the two texture lookups to define pixel data for rendering the corresponding triangles. It should be appreciated that with the de-indexing rasterization module 301 of the present invention, the dedicated hardware of the de-indexing module 203 can be eliminated from the vertex-pixel pipeline.

In one embodiment, the de-indexing rasterization module 301 creates a temporary buffer in the memory associated with the de-indexing rasterization module 301. The temporary buffer can be thought of as a temporary "frame" buffer, even though data written to the temporary "frame" buffer is not to be displayed. For ease of discussion, the term temporary buffer will be used. The temporary buffer represents a memory space to which the de-indexing rasterization module 301 can write de-indexed vertex data during the first texture lookup. It should be appreciated that the de-indexing rasterization module 301 views the temporary buffer on a per pixel basis, wherein each pixel is assigned to a particular location in the temporary buffer. Thus, in order to activate each "pixel" in the temporary buffer, the de-indexing rasterization module 301 is operated to draw a dummy geometry that covers the temporary buffer. In one embodiment, the dummy geometry is drawn as one or two large triangles.

Since the temporary buffer is being used to store de-indexed vertex data, each pixel location in the temporary buffer can be thought of as a unit of memory for storing the de-indexed vertex data. Because the temporary buffer is used as an output buffer for the de-indexing rasterization module 301 to write vertex data to be used as input, it is necessary for the de-indexing rasterization module 301 to support output to the vertex data type. In some cases, multiple output components can be used to form a given vertex data component and/or multiple pixels can be used to form a given vertex. For example, if the hardware is capable of writing up to 32 bits per pixel and there are four 32-bit floating values per vertex, then four pixels can be used to write a single vertex. Additionally, it should be appreciated that each pixel represented in the temporary buffer can be viewed as running its own program to decide what data is to be written at its memory location in the temporary buffer. Furthermore, each pixel's program operations are the same. However, the data associated with each pixel differs.

Each pixel represented in the temporary buffer needs to know which vertex data is to be written to its location in the temporary buffer. The vertex data to be written to a particular pixel location in the temporary buffer depends on the memory address of the particular pixel location in the temporary buffer. The memory address of the particular pixel location in the temporary buffer can be considered in terms of an offset from the beginning of the temporary buffer. In one embodiment, the pixel can query its memory location. In another embodiment, the pixel evaluates a formula based on its temporary buffer position to find its memory location.

Once each pixel knows what vertex index it needs to write to its memory location in the temporary buffer, the pixel uses the vertex index as a texture coordinate in a first texture lookup into the index buffer (IB) configured as a texture. The pixel then writes the returned vertex data to its location in the temporary buffer. After the temporary buffer has been written, the de-indexing rasterization module 301 is configured to output into the display frame buffer 207, using the temporary buffer as vertex data input read in a second texture lookup. The original vertex data (VB/VB') and index data (IB) may be discarded or saved for the next frame.

Because the present invention uses index data and vertex data as textures, it necessary that the de-indexing rasterization module 301 support textures in both the index data format (e.g., 8-bit, 16-bit, or 32-bit integers) and the vertex data format (e.g., fixed or float). Additionally, the de-indexing rasterization module 301 can be defined to support accessing the index data and the vertex data as one-dimensional textures or two-dimensional textures that are N×1. The de-indexing rasterization module 301 can also be defined to access the index data and vertex data as general two-dimensional textures by passing the texture coordinates through a formula, e.g., a hardware-dependent formula.

Figure 5:
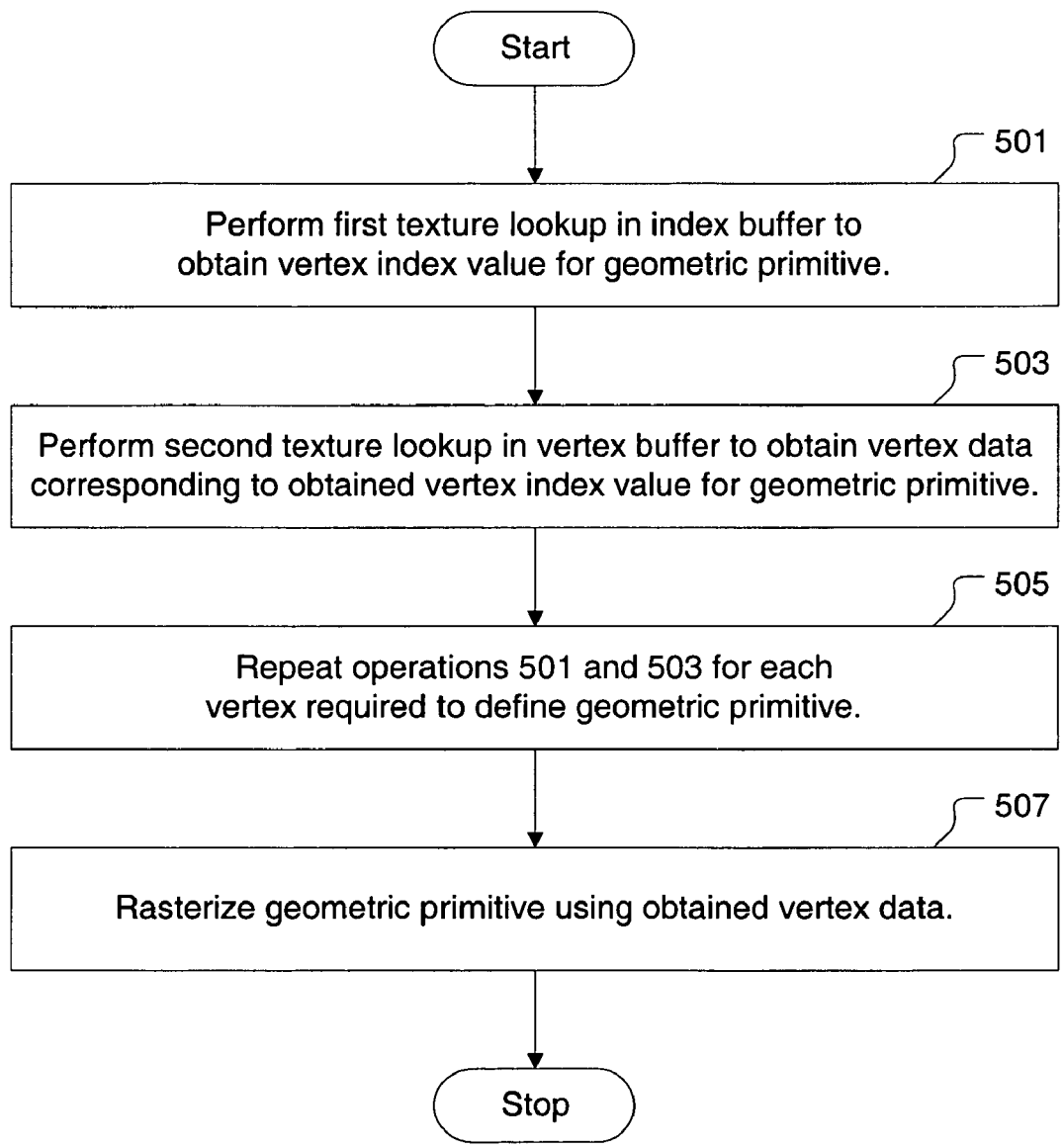
FIG. 5 is an illustration showing a flowchart of a method for operating a pixel shader to perform de-indexing of a geometric primitive to be displayed, in accordance with one embodiment of the present invention.

FIG. 5 is an illustration showing a flowchart of a method for operating a pixel shader to perform de-indexing of a geometric primitive to be displayed, in accordance with one embodiment of the present invention. The method includes an operation 501 for performing a first texture lookup in an index buffer to obtain a vertex index value for the geometric primitive to be displayed. The method also includes an operation 503 for performing a second texture lookup in a vertex buffer to obtain vertex data corresponding to the vertex index value previously obtained in the operation 501. In one embodiment, the vertex data included within the vertex buffer is processed into screen space prior to performing the second texture lookup. Also, in one embodiment, the index buffer and the vertex buffer are each transmitted to a memory within the pixel shader prior to performing operations 501 and 503. Additionally, in one embodiment, the vertex data obtained in operation 503 is stored in a scratch portion of a frame buffer, wherein the data stored in the scratch portion of the frame buffer is not to be explicitly displayed.

The method further includes an operation 505 for successively repeating operations 501 and 503 for each vertex required to define the geometric primitive to be displayed. In one embodiment, the geometric primitive to be displayed is a triangle. Therefore, in this embodiment, the operations 501 and 503 will be performed a total of three times for each triangle, i.e., once for each of the three vertices of each triangle. In an operation 507, the geometric primitive to be displayed is rasterized. The rasterizing of operation 507 is performed using the vertex data previously obtained through the successive performance of operations 501 and 503. The operations 501 through 507 are repeated for each geometric primitive within a scene to be displayed.

Figure 6:
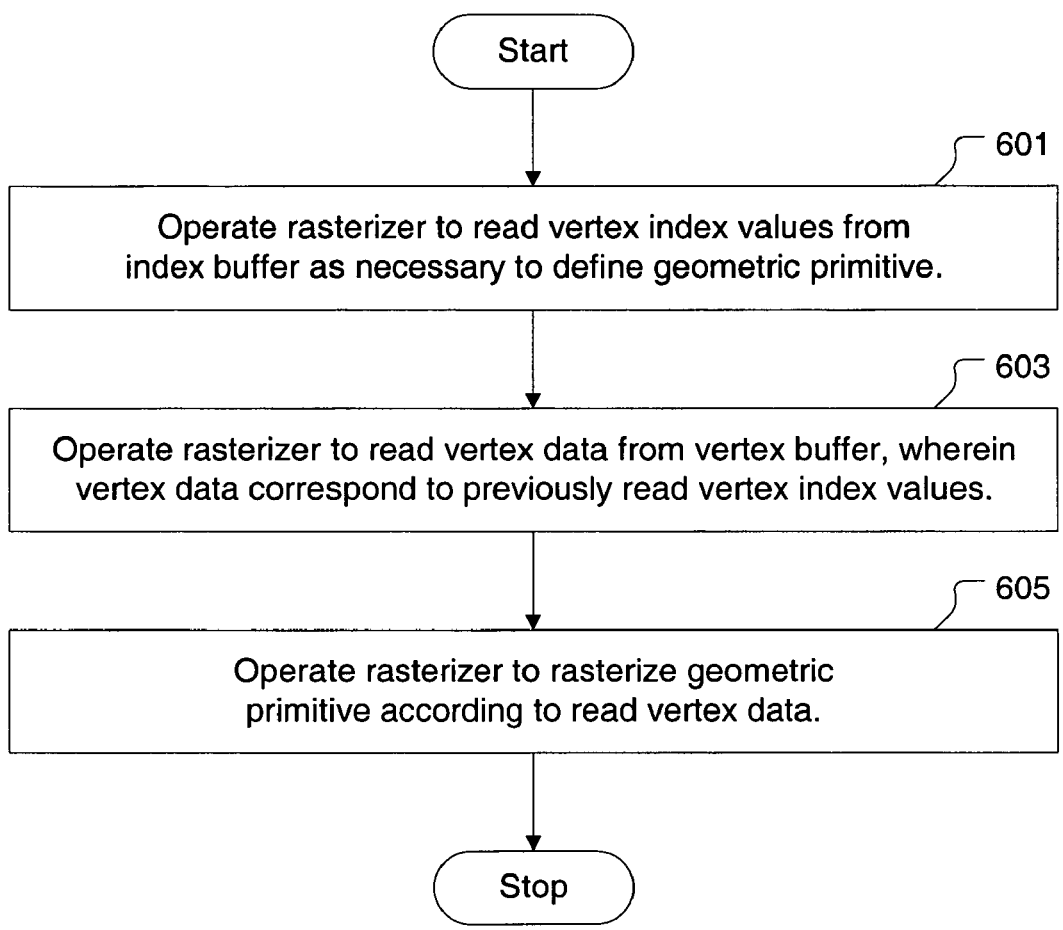
FIG. 6 is an illustration showing a flowchart of a method for de-indexing a geometric primitive to be displayed, in accordance with one embodiment of the present invention.

FIG. 6 is an illustration showing a flowchart of a method for de-indexing a geometric primitive to be displayed, in accordance with one embodiment of the present invention. The method includes an operation 601 for operating a rasterizer to read a number of vertex index values from an index buffer, wherein the number of vertex index values is sufficient to define the geometric primitive to be displayed. In one embodiment, the geometric primitive to be displayed is represented as a triangle having three vertices. The method also includes an operation 603 for operating the rasterizer to read vertex data from a vertex buffer, wherein the vertex data corresponds to each of the number of vertex index values read from the index buffer in the operation 601. Each of the number of vertex index values refers to a particular entry in the vertex buffer.

In one embodiment, the vertex data included within the vertex buffer is processed into screen space prior to performing the operation 603. Also, in one embodiment, the index buffer and the vertex buffer are transmitted to a memory within the rasterizer prior to performing operations 601 and 603 to read from the index buffer and the vertex buffer. In another embodiment, the vertex data obtained in the operation 603 is stored in a scratch portion of a frame buffer, wherein data stored in the scratch portion of the frame buffer is not to be displayed. The method further includes an operation 605 for operating the rasterizer to rasterize the geometric primitive to be displayed according to the vertex data read in the operation 603.

It should be appreciated that embodiments of the present invention as described herein may be incorporated into a computing device. The computing device may be represented as a video game console. It should be further appreciated that embodiments described herein may be implemented as either hardware, software, or a combination thereof.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Also, any of the operations described herein that form part of the invention can be performed by any suitable structural "means" that provide capability for performing the recited functionality. For instance, example structure is provided by way of the circuitry components referred to in the various embodiments of the claimed invention.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for operating a pixel shader to perform de-indexing of a geometric primitive to be displayed, comprising:
   (a) performing a first texture lookup in an index buffer to obtain a vertex index value for the geometric primitive to be displayed, wherein the vertex index value conveys an identity of a vertex of the geometric primitive, and wherein a given vertex is uniquely identified by a single vertex index value;
   (b) performing a second texture lookup in a vertex buffer to obtain vertex data corresponding to the vertex identified by the previously obtained vertex index value for the geometric primitive to be displayed;
   (c) repeating operations (a) and (b) for each vertex required to define the geometric primitive to be displayed; and
   (d) rasterizing the geometric primitive to be displayed, wherein the rasterizing is performed using the previously obtained vertex data generated from within the pixel shader.

2. The method of claim 1, further comprising:
   repeating the operations (a) through (d) for each geometric primitive within a scene to be displayed.

3. The method of claim 1, wherein the geometric primitive is represented as a triangle having three vertices.

4. The method of claim 1, wherein the vertex data included within the vertex buffer has been processed into screen space prior to performing the second texture lookup.

5. The method of claim 1, further comprising:
   storing the vertex data obtained by performing the second texture lookup in a scratch portion of a frame buffer, wherein data in the scratch portion of the frame buffer is not to be explicitly displayed.

6. The method of claim 1, further comprising:
   transmitting the index buffer and the vertex buffer to a memory within the pixel shader prior to performing operations (a) through (d).

7. A method for de-indexing a geometric primitive to be displayed, comprising:
   operating a rasterizer to read a number of vertex index values from an index buffer, wherein the number of vertex index values is sufficient to define the geometric primitive to be displayed, wherein each of the number of vertex index values conveys an identity of a vertex of a geometric primitive, and wherein a given vertex is uniquely identified by a single vertex index value;
   operating the rasterizer to read vertex data from a vertex buffer, wherein the vertex data corresponds to each vertex identified by the number of vertex index values having been read from the index buffer by the rasterizer, each of the number of vertex index values referring to a particular entry in the vertex buffer; and
   operating the rasterizer to rasterize the geometric primitive to be displayed according to the vertex data.

8. The method of claim 7, wherein the geometric primitive is represented as a triangle having three vertices.

9. The method of claim 7, wherein the vertex data included within the vertex buffer has been processed into screen space prior to operating the rasterizer to read vertex data from the vertex buffer.

10. The method of claim 7, further comprising:
    storing the vertex data obtained by operating the rasterizer to read vertex data from the vertex buffer, wherein the vertex data is stored in a scratch portion of a frame buffer, wherein data in the scratch portion of the frame buffer is not to be explicitly displayed.

11. The method of claim 7, further comprising:
    transmitting the index buffer and the vertex buffer to a memory within the rasterizer prior to operating the rasterizer to read from the index buffer and the vertex buffer.

12. An apparatus for rasterizing a geometric primitive to be displayed, comprising:
    first texture lookup circuitry defined within a rasterizer to obtain a vertex index value for the geometric primitive to be displayed, the vertex index value to be obtained from an index buffer, wherein the vertex index value conveys an identity of a vertex of the geometric primitive, and wherein a given vertex is uniquely identified by a single vertex index value;

second texture lookup circuitry defined within the rasterizer to obtain vertex data corresponding to the vertex identified by the previously obtained vertex index value for the geometric primitive to be displayed, the vertex data to be obtained from a vertex buffer, wherein the first and second texture lookup circuitry are further defined to operate to obtain a complete set of vertex data for the geometric primitive to be displayed; and rasterization circuitry defined within the rasterizer to generate pixel data for the geometric primitive to be displayed based on the complete set of vertex data.

13. The apparatus for claim 12, further comprising:

a memory defined within the rasterizer for storing the index buffer and the vertex buffer.

14. The apparatus of claim 12, wherein the geometric primitive is represented as a triangle having three vertices.

15. The apparatus of claim 12, wherein the vertex data included within the vertex buffer is processed into screen space prior to being obtained by the second texture lookup circuitry.

16. A computer readable media having program instructions stored thereon for operating a pixel shader to perform de-indexing of a geometric primitive to be displayed, comprising:

program instructions for performing a first texture lookup in an index buffer to obtain a vertex index value for the geometric primitive to be displayed, wherein the vertex index value conveys an identity of a vertex of the geometric primitive, and wherein a given vertex is uniquely identified by a single vertex index value;

program instructions for performing a second texture lookup in a vertex buffer to obtain vertex data corresponding to the vertex identified by the previously obtained vertex index value for the geometric primitive to be displayed;

program instructions for repeating the first and second texture lookups for each vertex required to define the geometric primitive to be displayed; and program instructions for rasterizing the geometric primitive to be displayed, wherein the rasterizing is performed using the previously obtained vertex data generated from within the pixel shader.

17. The computer readable media of claim 16, wherein the geometric primitive is represented as a triangle having three vertices.

18. The computer readable media of claim 16, wherein the program instructions for performing the second texture lookup are defined based on the vertex data included within the vertex buffer being previously processed into screen space.

19. The computer readable media of claim 16, further comprising:

program instructions for transmitting the index buffer and the vertex buffer to a memory within the pixel shader prior to performing the first and second texture lookups.

20. An apparatus for rasterizing a geometric primitive to be displayed, comprising:

means for performing a first texture lookup within a rasterizer to obtain a vertex index value for the geometric primitive to be displayed, the vertex index value to be obtained from an index buffer, wherein the vertex index value conveys an identity of a vertex of the geometric primitive, and wherein a given vertex is uniquely identified by a single vertex index value;

means for performing a second texture lookup within the rasterizer to obtain vertex data corresponding to the vertex identified by the previously obtained vertex index value for the geometric primitive to be displayed, the vertex data to be obtained from a vertex buffer, wherein the means for performing the first and second texture lookups are further defined to obtain a complete set of vertex data for the geometric primitive to be displayed; and means for generating pixel data for the geometric primitive to be displayed based on the complete set of vertex data.

* * * * *